United States Patent [19]
Naegeli

[11] 3,944,208
[45] Mar. 16, 1976

[54] VIBRATING RECEIVING DEVICE FOR FOLDING PUNCH TAPE

[76] Inventor: Lloyd Naegeli, 1908 Ridgemont Drive, Austin, Tex. 78723

[22] Filed: June 20, 1974

[21] Appl. No.: 481,165

[52] U.S. Cl. .............................. 270/61 F; 270/79
[51] Int. Cl.² .................................... B65H 45/00
[58] Field of Search ........ 270/61 F, 79, 39; 271/210

[56] References Cited
UNITED STATES PATENTS

| | | | |
|---|---|---|---|
| 3,342,390 | 9/1967 | Winterbottom et al. | 270/79 X |
| 3,363,895 | 1/1968 | Takashi Abe | 270/61 F |
| 3,391,929 | 7/1968 | Blair | 271/210 |
| 3,476,378 | 11/1969 | Loffler | 270/61 F |
| 3,498,601 | 3/1970 | Koval | 271/210 |
| 3,514,096 | 5/1970 | Muller | 270/61 F |

Primary Examiner—Lawrence Charles
Attorney, Agent, or Firm—Willard J. Hodges, Jr.

[57] ABSTRACT

A vibrating receiver for punch tape produced by Teletype or other high speed printer. The device is secured to resilient mounts on a base. A receiving magazine is vibrated by an electrically driven eccentric secured to an arm oscillating the magazine on the resilient mounts. As an alternate structure a rotating off-center weight tuned to the proper harmonic secured to the oscillating floor of the magazine might be used to impart vibrating motion.

5 Claims, 3 Drawing Figures

VIBRATING RECEIVING DEVICE FOR FOLDING PUNCH TAPE

BACKGROUND OF THE INVENTION

1. Field of the Invention

The inventor is in a position involving monitoring levels of pollutants by numerous devices feeding data to a data logger which every 5 minutes activates a Teletype punch tape print-out of the collected data. Instruments such as chromatograph, sulphur analyzer, chemiluminescence, confluence of haze, hydrocarbon methane, carbon monoxide, and ozone monitors provided data to the data logger which was recorded on punch tape by the Teletype. Prior to your applicant's invention the tape was collected loosely in a box then hand folded for packaging and shipment to the computer for analysis and printout. The former method was time consuming and wasteful of man hours.

The need for an efficient collecting and folding of the perforated punch tape prompted this invention. The device of this invention collects the tape in a magazine for removal and packaging in the original carton for shipment to the analyzing computer.

2. Description of Prior Art

Several devices for mechanical folding of continuous sheets of paper have been developed and patented. The majority utilized reciprocating arms creasing the folds in the paper. Another approach utilized progressive flaps nestling and folding the paper. The most relevant patent, to the best knowledge of your inventor, is U.S. Pat. No. 3,363,895 which is an oscillating punch tape guide agitating the continuous strip of folded tape as it is released from the printer.

SUMMARY OF THE INVENTION

The invention, though developed for and used in the preferred embodiment for collecting a continuous strip of punch tape in an Air Quality Control Monitoring Station has applicable uses in any data printout using continuous folded tape. A device employing a magazine of larger diameter might well prove beneficial in receiving wide, continuous fold sheets from a computer printout. The device is particularly suited for receiving the work product of a continuous, automatic operation providing quantities of data without constant human monitoring. The invention is visualized as having a wider application than the specific invention of the preferred embodiment. The preferred embodiment was valuable and useful in the specific application of the preferred embodiment of receiving recorded data from Teletype printout in an Air Quality Control Station. The invention, however, has other uses and equivalent modifications are apparent from study of the drawings and description.

DESCRIPTION OF THE PREFERRED EMBODIMENT

The preferred embodiment was employed for receiving and storing a continuous strip of folded punch tape produced by a Teletype. The Teletype was activated each five minutes to receive data from a data logger. In the printout and punch tape recording 15 factors were received. Channels: 0. wind direction; 1. wind speed; 2. ambiant temperature; 3. total hydrocarbons; 4. methane; 5. carbon monoxide; 6. ozone; 7. total sulphur; 8. hydrogen sulfide; 9. sulphur dioxide; 10. nitrogen oxide; 11. nitrogen dioxide; 12. ozones of nitrogen; 13. test temperature 1; 14. test temperature 2; 15. the confluence of haze. The foregoing data was continuously received every 5 minutes for a 24 hour or longer period, collected, and shipped to a computer for comparative analysis.

Prior to this invention a pile of tape was collected and hand sorted. Hours could be consumed and on occasions the tape was damaged in the process. The device of the preferred embodiment receives and nestles these continuous folds of tape without human assistance for a 24 hour period to 48 hour period.

Figure 1:
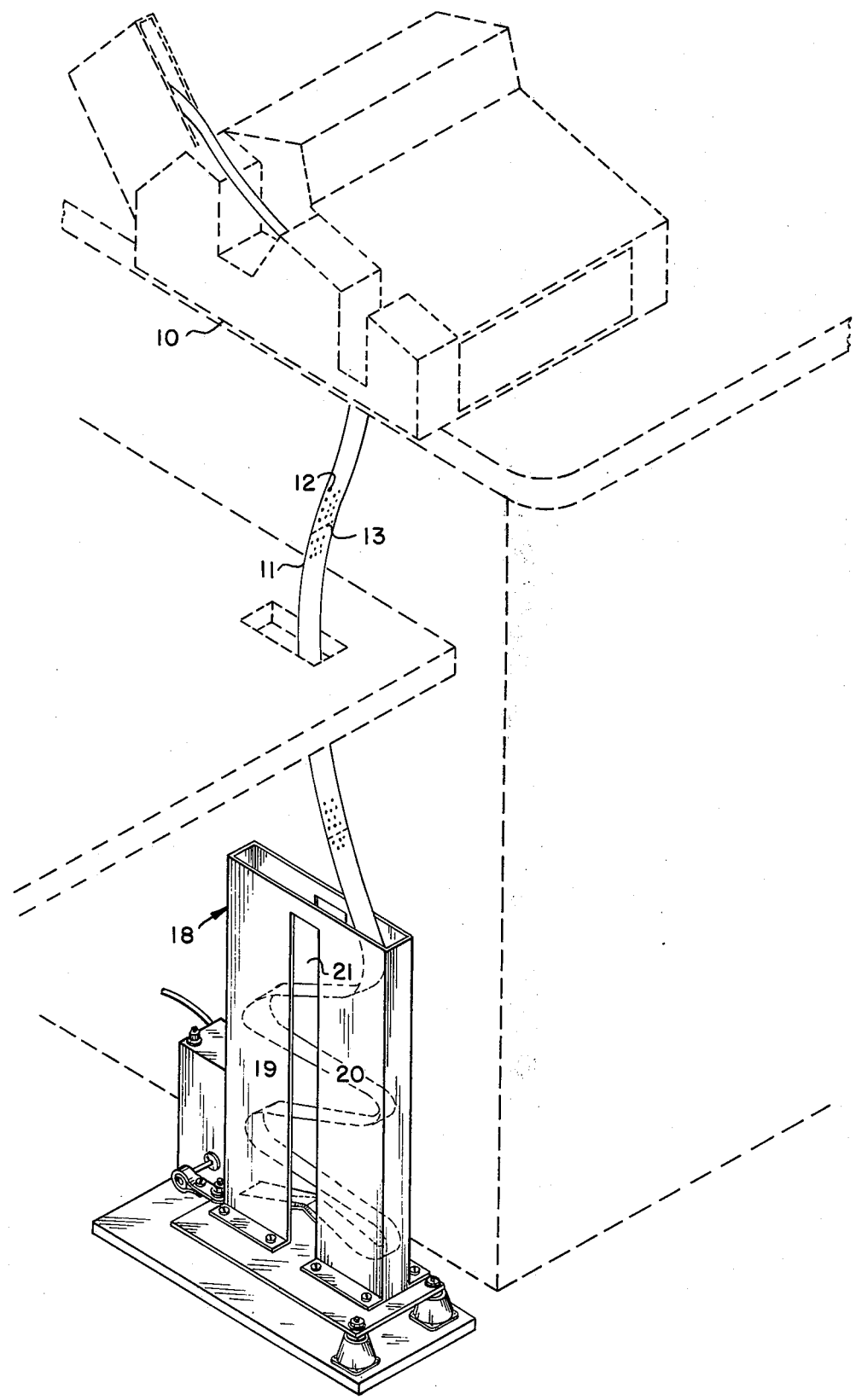
FIG. 1 is a composite presentation of the Teletype machine simulating production and receiving punch tape by the device.
Figures 2, 3:
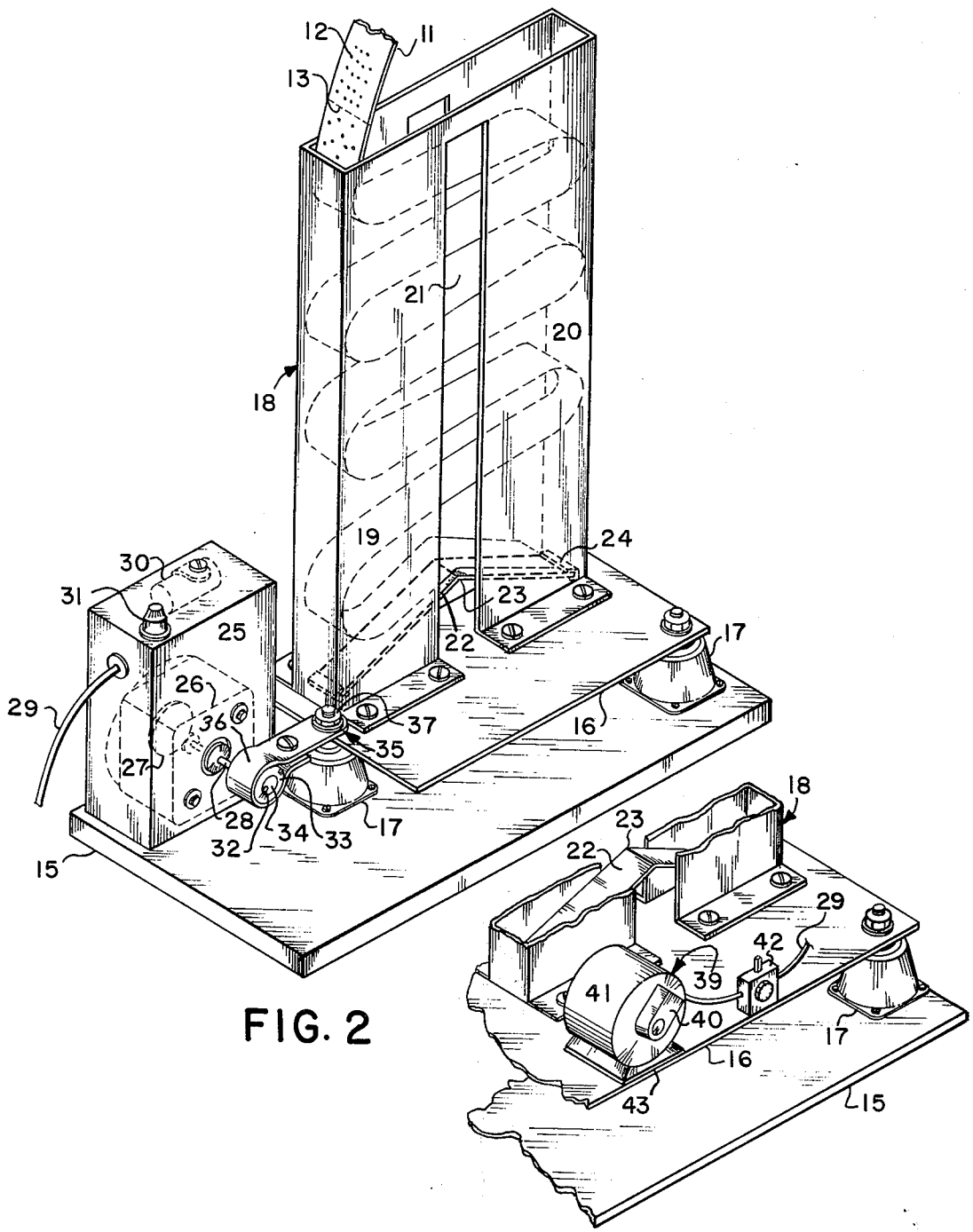
FIG. 2 is a perspective detailed view of the eccentric agitated preferred embodiment.
FIG. 3 is a fragmented suggested modification of the device employing an oscillating weight agitator.

For an illustration of the environment of this invention your attention is invited to FIG. 1. A high speed punch tape printer 10 produces a continuous strip of punch tape 11 having a perforated printout 12. The tape in the specific application is one inch wide and laterally perforated to produce folds 13 every 8½ inches. The invention is capable of handling tapes or sheets of other dimensions with comparable modifications of the dimensions of the device. The preferred embodiment was constructed on a wooden base 15 which was 15 inches long and 8 inches wide. Mounted above the base 15 is a 1/16 inch thick sheet of aluminum 10 inches long and 6 inches wide constituting the oscillating floor 16. Oscillating floor 16 was mounted on three neopreme or rubber resilient mounts 17. The mounts 17 in the preferred embodiment were resilient shock mounts of the type utilized for mounting radio or other instruments in a mobile vehicle. Springs or other mounting means might well be used. In a configuration compatible with the dimensions of the punch tape to be received, there was secured normal to oscillating floor 16 a receiving magazine 18. This magazine 18 was constructed with interior dimensions of 1¼ inches wide and 8½ inches long. The preferred embodiment was slightly over 15 inches high; however, this dimension is optional. The magazine was constructed in two sections with a U-shaped first fold arm 19 and a U-shaped second fold arm 20. These sections were spaced on the oscillating floor 16 in a manner to leave a 1½ inch magazine slot 21. Loosely resting in the lower extremities of magazine 18 is a tape fold compensator 22 which in the preferred embodiment comprised an aluminum strip 1 inch wide, 8½ inches long with a bend 23 in the center at a 45° angle. This compensator bend 23 might well be arcuate in configuration; however, the angular bend illustrated at 23 was quite satisfactory in the preferred embodiment. Each end of tape fold compensator 22 was covered by a neoprene or rubber compensator end cushions 24.

Mounted on base 15 spaced from oscillating floor 16 constructed of sheet aluminum was oscillator housing 25. This housing contained fractional horse power electric motor 26 incorporating a low rpm reduction gear 27. The drive shaft 28 projected from oscillator housing 25. Attached to oscillator housing 25 was power cord 29 which could be attached to any suitable exterior source of electric current. For the protection of the motor included in the circuit was a condenser 30 as well as a fuse 31. This wiring harness and components is a matter of choice. The only requirement in the preferred embodiment was to produce a means for rotating a drive shaft 28 at approximately 300 rpm. Mounted on drive shaft 28 was eccentric drive 32. This eccentric 32 was produced by drilling a one-fourt inch hole adjacent the circumference of a piece of ½inch aluminum stock to secure the eccentric drive 32 to drive shaft 28. A roller bearing 33 with an exterior diameter of approximately 1 inch with an interior diameter compatible with the eccentric drive 32 was then mounted on drive shaft 23. Bearing 33 and related components comprising an eccentric cam 34 was secured to agitator arm 35 by means of a bearing support 36. The opposite end of agitator arm 35 was seucred to the oscillating floor 16 by means of arm oscillator attachment 37. This arm oscillator attachment 37 incorporated a neoprene or rubber shock mount bushing which was, in the preferred embodiment, directly attached to one of the shafts of a resilient shock mount 17. The foregoing configuration comprised the preferred embodiment and operated quite satisfactorily in the environment above described.

An obvious modification would be to construct magazine 18 mounted on an oscillating floor 16 on resilient mounts 17 and agitating the device by means of an oscillator 39 mounted on oscillator floor 16. This device would comprise an off-center oscillating weight 40 driven by an AC/DC variable speed motor 41 whose rate of oscillation would be controlled by a potentiometer 42 or a silicone rectifier speed control. This device would be secured to oscillating floor 16 by means of oscillator mounting means 43. The device of this configuration was constructed and successfully used in operation; however, it is pertinent to note that the potentiometer 42 must be adjusted to arrive at a frequency of rotation of oscillator 39 which is at a harmonic to the harmonic of the magazine 18 oscillating floor 16 and resilient shock mounts 17. This can be arrived at by trial and error adjustment of the potentiometer 42.

OPERATION OF THE DEVICE

The operation of this device is rather self-evident from the composite illustration of FIG. 1. All that is required in placing the device in successful operation is to position the vibrating receiver device for fold punch tape directly beneath the Teletype or other high-speed punch tape printer 10. The magazine 18 of the device is so positioned as to permit punch tape 11 to nestle into magazine 18 with a natural sequence of fold on the perforated folds 13 feeding into magazine 18 with no stress. The attaching of cord 29 to an external source of electricity continually oscillates the device and receives and stores punch tape 11. A few minutes of monitoring on initial set-up is all that is required.

After describing in detail the construction and operation of the preferred embodiment and suggesting at least one probable modification of the device what is desired to be claimed is all applications and modifications of the invention not departing from the scope of equivalents of appended claims.

I claim:
1. A vibrating receiving device for continuous folded material comprising:
   a. a base means adapted to rest on a flat surface,
   b. an oscillating floor mounted above said base means,
   c. a multiplicity of resilient mounts supporting said oscillating floor above the said base means,
   d. a magazine adapted to receive continuous folded material secured to and projecting upward normal to said oscillating floor, and
   e. oscillating means attached to said oscillating floor said oscillating means further comprising:
      1. an eccentric drive means securely retained relative to said base,
      2. an arm oscillator attachment securely affixed to said oscillating floor,
      3. an agitator arm interconnecting said eccentric drive means and said oscillator arm attachment agitating said floor responsive to rotation of said eccentric drive means.
2. The invention of claim 1 wherein said magazine includes an angular tape fold compensator nestling in said magazine adjacent said oscillating floor.
3. The invention of claim 1 wherein said magazine includes an arcuate tape fold compensator nestling in said magazine adjacent said oscillating floor.
4. The invention of claim 1 wherein said magazine comprises:
   a. a first fold arm mounted on said oscillating floor projecting upward normal thereto, and
   b. a second fold arm mounted on said oscillating floor projecting upward and normal thereto, said second fold arm spaced from said first fold arm, said space defining,
   c. a magazine slot projecting normal to said oscillating floor, said slot projecting for substantially the height of said first and second fold arm.
5. The invention of claim 4 further comprising:
   a. a tape fold compensator mounted in said magazine adjacent said oscillating floor, said tape fold compensator including,
   b. a compensator bend at substantially the center of said magazine slot.

* * * * *